US012785351B2

(12) United States Patent
Schüsslbauer

(10) Patent No.: US 12,785,351 B2
(45) Date of Patent: Nov. 3, 2026

(54) FREQUENCY-CONVERTING LASER DEVICE

(71) Applicant: Hitachi Industrial Equipment Systems Co., Ltd., Tokyo (JP)

(72) Inventor: Wolfgang Schüsslbauer, Boppelsen (CH)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 554 days.

(21) Appl. No.: 18/464,400

(22) Filed: Sep. 11, 2023

(65) Prior Publication Data

US 2023/0420906 A1 Dec. 28, 2023

Related U.S. Application Data

(63) Continuation of application No. PCT/EP2022/055236, filed on Mar. 2, 2022.

(30) Foreign Application Priority Data

Mar. 11, 2021 (DE) ..................... 10 2021 202 391.6

(51) Int. Cl.
*H01S 3/109* (2006.01)
*G02F 1/35* (2006.01)
(Continued)

(52) U.S. Cl.
CPC ............ *H01S 3/109* (2013.01); *G02F 1/3507* (2021.01); *H01S 3/08054* (2013.01); (Continued)

(58) Field of Classification Search
CPC .. H01S 3/109; H01S 3/08054; H01S 3/09415; H01S 3/10061; H01S 3/117; H01S 3/1611; H01S 3/1673; G02F 1/3507
See application file for complete search history.

(56) References Cited

U.S. PATENT DOCUMENTS 5,031,182 A 7/1991 Anthon et al.
5,249,190 A 9/1993 Kortz et al.
(Continued)

FOREIGN PATENT DOCUMENTS

DE 3917902 A1 12/1990
DE 69008415 T2 8/1994

OTHER PUBLICATIONS

Perkins P E et al, "Efficient Intracavity Doubling in Flash-Lamp-Pumped ND:YLF", Journal of the Optical Society of America—B, Optical Society of America, Washington, US, Band 4, Nr. 8, Aug. 1, 1987 (Aug. 1, 1987), p. 1281-1285, XP000709833, ISSN:0740-3224, p. 1281, left column, paragraph 3-p. 1283, right column, paragraph 1; figures 1-4.

(Continued)

*Primary Examiner* — Yuanda Zhang
(74) *Attorney, Agent, or Firm* — Crowell & Moring LLP

(57) ABSTRACT

A frequency-converting laser device that is efficient but at the same time has a simple structure contains an optical resonator that has two resonator mirrors, specifically a coupling-out mirror and an end mirror. The laser device furthermore contains an optically active medium for generating light of a first frequency and an optically nonlinear medium for converting light of the first frequency into light of another frequency. The optically active medium and the optically nonlinear medium are in this case arranged in a beam path between the resonator mirrors. The laser device furthermore contains a first polarization-influencing laser optic that polarizes the light of the first frequency, reflected by the coupling-out mirror in the direction of the end mirror, such that a frequency conversion of the light thus polarized of the first frequency is suppressed, in particular minimized, when passing through the nonlinear medium.

19 Claims, 3 Drawing Sheets

(51) Int. Cl.

| | |
|---|---|
| ***H01S 3/08*** | (2023.01) |
| ***H01S 3/0941*** | (2006.01) |
| ***H01S 3/10*** | (2006.01) |
| ***H01S 3/117*** | (2006.01) |
| ***H01S 3/16*** | (2006.01) |

(52) U.S. Cl.
CPC ...... *H01S 3/09415* (2013.01); *H01S 3/10061* (2013.01); *H01S 3/117* (2013.01); *H01S 3/1611* (2013.01); *H01S 3/1673* (2013.01)

(56) References Cited

U.S. PATENT DOCUMENTS

| | | | | |
|---|---|---|---|---|
| 5,671,232 | A * | 9/1997 | Lee ........................ | H01S 3/109 372/27 |
| 2005/0276300 | A1 * | 12/2005 | Ishizu ..................... | H01S 3/094 372/75 |
| 2006/0045148 | A1 | 3/2006 | Zhang et al. | |
| 2006/0046148 | A1 | 3/2006 | Sakai et al. | |
| 2011/0122896 | A1 * | 5/2011 | Mao ...................... | H01S 3/0812 372/12 |
| 2012/0128014 | A1 | 5/2012 | Gu et al. | |

OTHER PUBLICATIONS

Piehler Stefan et al, "Highly efficient 400?? W near-fundamental-mode green thin-disk laser", Optics Letters,Band 41, Nr. 1, Jan. 1, 2016 (Jan. 1, 2016), p. 171, XP055936108, DOI: 10.1364/OL.41.000171, ISSN:0146-9592, p. 171, right column, paragraph 4-p. 173, right column, paragraph 1; figures 1-5.

Oka, Michie et al. "Stable intracavity doubling of orthogonal linearly polarized modes in diode-pumped Nd: VAG lasers." Optics letters 13.10 (1988): 805-807.

P.E.Perkins and T.A.Driscoll, Efficient intracavity doubling in flash-lamp-pumped Nd:YLF, Optocal Society of America, Aug. 1987, 1281, vol. 4, No. 8.

* cited by examiner

FREQUENCY-CONVERTING LASER DEVICE

CROSS-REFERENCE TO RELATED APPLICATION

This application is a continuation, under 35 U.S.C. § 120, of copending International Patent Application PCT/EP2022/055236, filed Mar. 2, 2022, which designated the United States; this application also claims the priority, under 35 U.S.C. § 119, of German Patent Application DE 10 2021 202 391.6, filed Mar. 11, 2021; the prior applications are herewith incorporated by reference in their entireties.

FIELD AND BACKGROUND OF THE INVENTION

The invention relates to a frequency-converting laser device, i.e., to an optical device for generating and optionally for guiding, forming, converting, and/or amplifying a laser beam.

Solid state lasers are often used for industrial applications such as engraving or inscribing by means of laser radiation, thus laser devices, the active optical medium of which is formed by a crystalline or glass-like (i.e., amorphous) solid body. The light generated by such solid bodies is generally in the infrared range, in particular at wavelengths above 800 nm. In contrast, up to this point no suitable (in particular commercially usable) solid materials have been available for generating shorter-wave light, as is required for many applications.

One method, which is typical per se, for generating laser light in the green, blue, violet, or ultraviolet spectral range nonetheless by means of a solid-state laser is so-called frequency conversion. For this purpose, a part of the light initially generated in a fundamental frequency (also: basic frequency) is converted by an (optical) nonlinear medium into light of another frequency. The frequency of the converted light is often a multiple of the fundamental frequency in this case, in particular two times or three times the fundamental frequency. The frequency-converted light is coherent with the light of the fundamental frequency from which it results and is emitted in the same direction.

The nonlinear medium is often arranged in the resonator cavity of the laser device, so that the frequency-converted light arises in the resonator. This method of frequency conversion is therefore also designated as “intra-cavity nonlinear frequency conversion” in technical terms. In such resonators, the light of the fundamental frequency passes through the nonlinear medium on its path between the resonator mirrors in both directions, wherein a frequency conversion takes place in each case. Accordingly, the frequency-converted light is also emitted by the nonlinear medium not only in the forward direction (i.e., in the direction toward the decoupling mirror of the resonator), but also in the reverse direction (i.e., in the direction toward the opposite end mirror of the resonator). While the component of the frequency-converted light emitted in the forward direction can simply be used by decoupling from the resonator, the component of the frequency-converted light emitted in the reverse direction generally represents an undesired interference signal, since this light impairs the efficiency and stability of the laser activity due to negative interference with the frequency-converted light emitted in the forward direction. Furthermore, the component of the frequency-converted light emitted in the reverse direction results in an increased load (and therefore increased wear) of the components of the resonator, in particular of the active medium.

To counteract this disadvantage, frequency-converting laser devices have heretofore been equipped with a folded resonator. For this purpose, a deflection mirror is interposed between the two resonator mirrors, which deflects the light of the fundamental frequency and thus divides the resonator into two arms. The active medium is arranged here in one arm of the folded resonator, while the nonlinear medium is arranged in the second arm. The deflection mirror is transmissive for the frequency of the converted light. In this way, the converted light only circulates in the second arm of the resonator.

In this case, the deflection mirror can also be used for decoupling the converted light from the resonator. To increase the efficiency of the resonator still further, a third resonator mirror can alternatively be arranged downstream of the deflection mirror—in extension of the second resonator arm—which reflects the frequency-converted light transmitted through the deflection mirror back into the second resonator arm. The second resonator arm therefore forms, with the third resonator mirror, a separate resonator cavity for the frequency-converted light, which forces a resonant frequency conversion.

Such folded resonators require a high level of production expenditure due to the significantly higher complexity of the structure, however, which restricts the commercial usability of corresponding laser devices. In particular, active stabilization measures are often necessary in order to match the length of the two resonator arms or resonator cavities to one another.

In addition, folded resonators occupy a comparatively large installation space, which also restricts the usability of corresponding laser devices.

SUMMARY OF THE INVENTION

The invention is based on the object of specifying a frequency-converting laser device which is effective but at the same time simple to implement.

This object is achieved according to the invention by a laser device having the features of the independent claim. Advantageous embodiments and refinements of the invention, which are partially inventive as such, are described in the dependent claims and the following description.

The laser device according to the invention contains, in a way typical per se, an optical resonator, which includes two resonator mirrors, namely a decoupling mirror and an end mirror. The decoupling mirror represents the front side of the resonator. Accordingly, the propagation direction of the light cast on the decoupling mirror is designated as the “forward direction”. Light incident on the end mirror, in contrast, propagates in the “reverse direction”. The resonator furthermore contains an optical active medium (laser medium), which generates light of a first frequency during operation of the laser device. The first frequency is also designated hereinafter as the “fundamental frequency”. The light of the first frequency is accordingly designated as the “fundamental wave”.

In addition to the resonator, the laser device comprises an (optical) nonlinear medium, which in operation of the laser device converts light of the first frequency, in other words thus a part of the fundamental wave, into light of another frequency. The other frequency is in this case preferably but not necessarily an integer multiple of the fundamental frequency, in particular double, triple or quadruple. The frequency-converted light of the other frequency is generally designated hereinafter in distinction from the fundamental wave as the “converted wave”. If the other frequency is an integer multiple of the fundamental frequency, the frequency-converted light is also designated as the "harmonic wave" or "harmonic" for short. In case of a frequency doubling, the frequency-converted light is also designated here as the "second harmonic", in case of a frequency tripling also as the "third harmonic", etc.

The decoupling mirror is configured such that it is (entirely or at least partially) transmissive for the converted wave. In contrast, both resonator mirrors are preferably opaque for the fundamental wave.

The optical nonlinear medium is arranged inside the resonator. Both the optical active medium and the optical nonlinear medium are thus arranged in a beam path between the resonator mirrors.

According to the invention, the laser device now contains, in addition to the above-described parts, a (first) polarization-influencing laser optical unit, which polarizes the light of the first frequency (thus the fundamental wave) reflected from the decoupling mirror in the direction toward the end mirror such that a frequency conversion of this polarized light upon passage through the nonlinear medium is suppressed. This first polarization-influencing laser optical unit (designated hereinafter without restriction of the generality in short as the "(first) polarizer") is arranged in particular between the nonlinear medium and the decoupling mirror in the beam path of the resonator. In other words, the first polarizer causes the fundamental wave passing in the reverse direction through the nonlinear medium to induce no frequency conversion or at least a weaker frequency conversion than in the absence of the first polarizer. The frequency conversion induced by the fundamental wave passing in the reverse direction through the nonlinear medium is in particular minimized by suitable polarization of the fundamental wave.

"Polarization" or "polarizing" is generally understood here and hereinafter as a change of the polarization properties. The light polarized by the first polarizer thus has different polarization properties than previously. For example, a polarization direction of the fundamental wave is rotated by the first polarizer, a linear polarization is converted into a circular polarization, or a circular polarization is converted into a linear polarization.

It is known and, for example, described in German utility model DE 690 08 415 T2 that—depending on the type and/or configuration of the optical nonlinear medium (for example, the orientation of the crystal axes in relation to the propagation direction of the incident wave)—there are two types of frequency conversion, which are designated as "type I" and "type II". A frequency conversion of type I is caused by interaction of incident waves of the same polarization with the nonlinear medium. A frequency conversion of type II, in contrast, requires the interaction of incident waves of orthogonal polarization with the nonlinear optical medium. Optical nonlinear media, which cause a frequency conversion of "type I" or "type II" due to their type and/or configuration, are also designated hereinafter in short as "type I media" or "type II media" (in the case of nonlinear optical crystals as "type I crystals" or "type II crystals"). The invention is based on the finding that in particular a frequency conversion of type I in optical nonlinear media regularly has a pronounced dependence on the polarization of the incident light. Light of a specific polarization direction is converted here with maximum effectivity, while light of a polarization direction perpendicular thereto is converted with minimal effectivity or even not at all. This effect is utilized according to the invention to increase the efficiency of the resonator. Due to the suppression of the frequency conversion in the reverse direction, the component of the converted wave emitted in the reverse direction is completely or at least partially reduced, by which the disadvantages explained at the outset are avoided. A high resonator efficiency is thus achieved in an easily implementable manner.

In a preferred embodiment, the laser device contains, in addition to the above-described first polarizer, a second polarization-influencing laser optical unit, which is designated hereinafter (again without restricting the generality) in short as the "second polarizer". This second polarizer has an opposite effect in comparison to the first polarizer, in that it polarizes the light of the first frequency propagating in the direction of the decoupling mirror (thus the fundamental wave propagating in the forward direction) such that a frequency conversion of this polarized light is promoted, in particular maximized, during the passage through the nonlinear medium.

Therefore, the second polarizer, which is arranged in particular between the laser medium and the nonlinear medium in the beam path of the resonator, causes the fundamental wave passing through the nonlinear medium in the forward direction to induce a stronger frequency conversion than in the absence of the first polarizer.

The first polarizer and—if provided—also the second polarizer are preferably formed by a wave plate (also: retarder plate), in particular a quarter-wave plate, or by a polarization rotator, e.g., a Faraday rotator, a quartz crystal rotator, or a liquid crystal rotator. In embodiments of the laser device in which both the first polarizer and the second polarizer are provided, the two polarizers can be configured identically or differently in the scope of the invention. In one preferred embodiment of the invention, a quarter-wave plate is thus used as the first polarizer and a polarization rotator is used as the second polarizer. The polarization rotator is designed in this case in particular such that it rotates the polarization direction of the incident fundamental wave by 45°. In an alternative embodiment of the laser device, both the first polarizer and the second polarizer are each formed by a polarization rotator. These polarization rotators are also designed here in particular such that they each rotate the polarization direction of the incident fundamental wave by 45°.

The concentration of the frequency conversion on the fundamental wave running in the forward direction, which is achieved by the at least one polarizer, enables a simple design of the resonator, without having to accept poor resonator efficiency at the same time. In particular, a folded embodiment of the resonator is neither necessary nor preferred. Rather, in one preferred embodiment, the resonator includes a linear beam path; i.e., the resonator mirrors, the laser medium, the optical nonlinear medium, and the or each polarizer are arrayed along a linear optical axis. High stability of the laser beam generated in operation of the laser device is achieved by the simple structure with comparatively low expenditure. Active stabilizers are not necessary and are therefore also not provided in one preferred embodiment of the invention.

Since the first polarizer is adapted to influencing the fundamental wave, it has an a priori undefined influence on the frequency-converted light (i.e., on the converted wave). The laser beam decoupled from the resonator is therefore also generated having a priori undefined polarization properties. To nonetheless ensure defined polarization properties of the laser beam, in one preferred embodiment, the laser device comprises, in addition to the first polarizer and—if provided—the second polarizer, a third polarization-influencing laser optical unit (also designated as the "third polarizer"), which is connected downstream of the decoupling mirror and is therefore arranged outside the resonator. This third polarizer is configured to compensate for the influence of the first polarizer on the converted wave (and thus on the laser beam decoupled from the resonator). In other words, the effect of the first polarizer on the converted wave is reversed by the third polarizer. In one particularly expedient embodiment of this variant of the invention, the first polarizer and the third polarizer are formed by structurally identical quarter-wave plates, which are rotated relative to one another by 90° around the optical axis, however. The term "quarter-wave" relates in this case to the wavelength of the fundamental wave in both polarizers.

In general, the laser device can be operated in the scope of the invention as a continuously emitting laser (CW laser) or as a pulsed laser.

The laser device is preferably a quality-switched laser (q-switched laser). In this embodiment, the laser device additionally comprises a quality switch (q-switch) arranged in the beam path of the resonator, in particular between the laser medium and the nonlinear medium or—if provided—the second polarizer, by which the quality of the resonator can be changed. The quality switch is preferably an active quality switch, which is based, for example, on an electro-optical functional principle (e.g., Pockels cell, Kerr cell, or electro-optical modulator) or an acousto-optical functional principle (for example Bragg cell). In principle, the laser device can also contain a passive quality switch in the scope of the invention, in particular in the form of a semiconductor absorber mirror (SESAM) or a nonlinear crystal (for example, a Cr:YAG crystal). Alternatively, the laser device is a mode-coupled laser.

The laser device is preferably a solid-state laser. The active optical medium accordingly preferably contains a solid, in particular a neodymium-doped yttrium-orthovanadate crystal (Nd:$YVO_4$ crystal).

The nonlinear medium preferably contains a medium which is configured with respect to its type and/or configuration, for example, the alignment in relation to the propagation direction of the incident wave, for a frequency conversion of type I (i.e., a frequency conversion into type I phase match configuration). The medium is preferably a solid here, namely an optical nonlinear (type I) crystal, in particular a crystal made of lithium triborate (LBO).

In a special variant of the invention, the nonlinear medium, in particular for generating higher harmonics of the first fundamental wave, includes at least two optical nonlinear crystals connected in succession, in particular LBO crystals. In this case, a first of the two crystals is preferably a crystal in a type I phase match configuration. This first crystal is used in this case to generate a first converted wave of moderate frequency (for example double the frequency in comparison to the fundamental frequency) from the fundamental wave. The second crystal, which is used in particular to generate a second converted wave of higher frequency (for example, a wave having triple the fundamental frequency) with interaction of the fundamental wave and the first converted wave, can in principle in the scope of the invention also be formed by a crystal in a type I phase match configuration. However, a crystal in a type II phase match configuration is preferably used for the second crystal.

Other features which are considered as characteristic for the invention are set forth in the appended claims.

Although the invention is illustrated and described herein as embodied in a frequency-converting laser device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Parts and structures corresponding to one another are always provided with identical reference signs in all figures.

Figure 1:
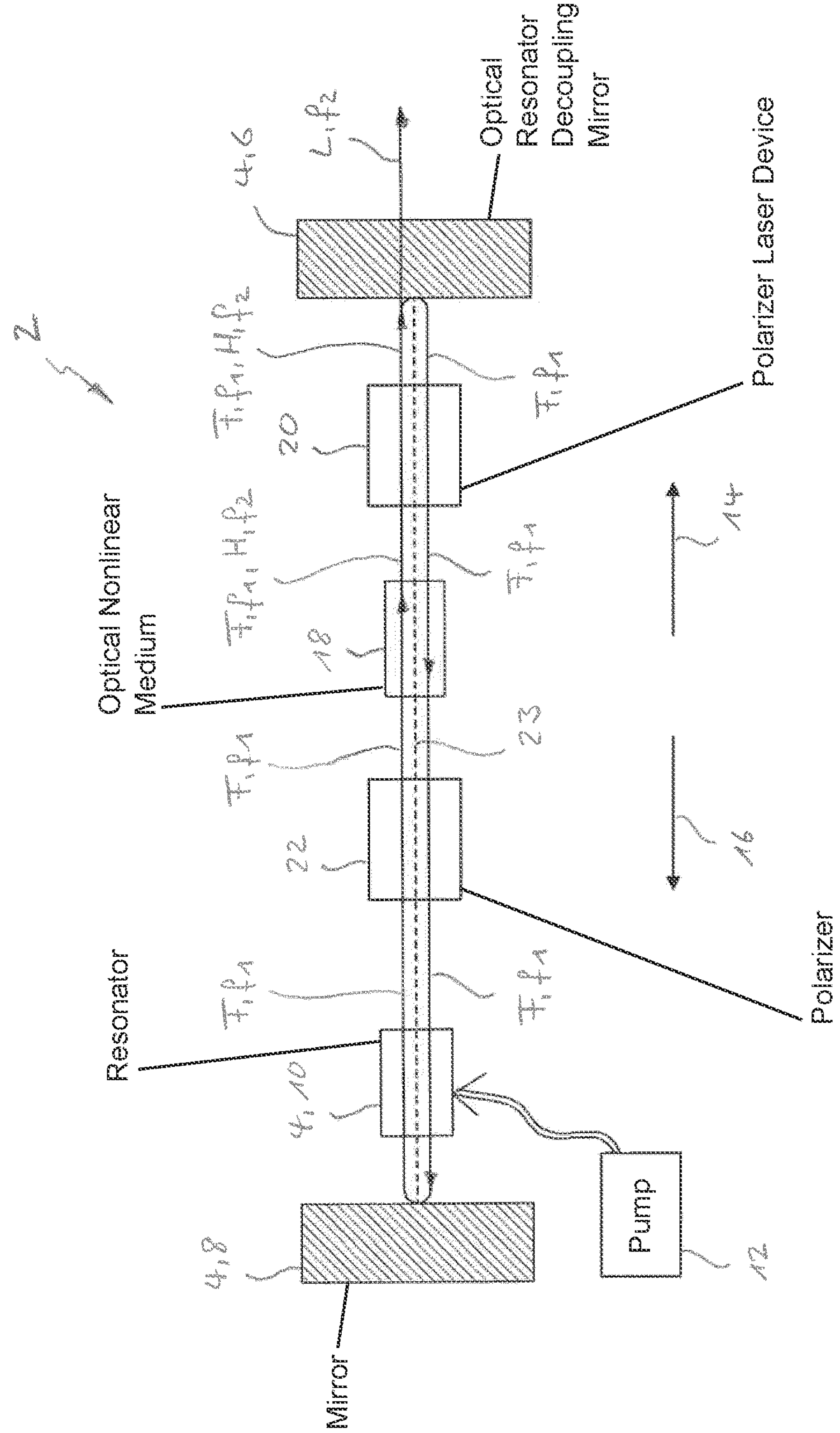
FIG. 1 is a schematic simplified representation of a basic principle of a laser device according to the invention.

Referring now to the figures of the drawings in detail and first, particularly to FIG. 1 thereof, there is shown, in roughly schematic form, a laser device 2 having an optical resonator 4. The resonator 4 is formed by two resonator mirrors 6, 8, namely a decoupling mirror 6 and an end mirror 8. It furthermore includes a (laser) medium 10, which is energetically excited ("pumped") in operation of the laser device 2 by means of a pump device 12 (only indicated in FIG. 1) by supplying light or electrical energy.

In operation, the laser medium 10 excited by the pump device 12 emits light of a fundamental frequency $f_1$, which circulates between the resonator mirrors 6, 8 in a forward direction 14 (oriented from the end mirror 8 onto the decoupling mirror 6) and a reverse direction 16 (oriented from the decoupling mirror 6 onto the end mirror 8). For this light, designated hereinafter as the fundamental wave F, the decoupling mirror 6 and the end mirror 8 are opaque (in the scope of the quality of the resonator mirrors 6, 8 implemented in production).

Furthermore, an optical nonlinear medium 18 is arranged in the resonator 4, which in operation of the laser device 2 converts a part of the fundamental wave F into light of a second frequency $f_2$. In the illustrated example, the second frequency $f_2$ corresponds to an integer multiple of the fundamental frequency $f_1$ ($f_2=n\cdot f_1$; with n=2, 3, 4, . . . ). The frequency-converted light of the second frequency $f_2$ is therefore designated hereinafter as the harmonic wave H.

The decoupling mirror 6 is configured such that it is transmissive for the harmonic wave H (completely or at least in the scope of the achievable quality of the decoupling mirror 6 as extensively as possible).

The nonlinear medium 18 is arranged inside the resonator 4, thus between the resonator mirrors 6, 8.

A first polarizer 20 is on the one hand interconnected between the nonlinear medium 18 and the decoupling mirror 6. In operation of the laser device 2, this first polarizer 20 influences the polarization of the fundamental wave F reflected by the decoupling mirror 6 and thus propagating in the reverse direction 16 such that the fundamental wave F polarized in this manner passes in the reverse direction 16 through the nonlinear medium 18 without triggering a frequency conversion. An emission of frequency-converted light in the reverse direction 16 is thus suppressed by the polarization of the fundamental wave F by means of the first polarizer 20.

On the other hand, a second polarizer 22 is interconnected between the laser medium 10 and the nonlinear medium 18. In operation of the laser device 2, this second polarizer 22 influences the polarization of the fundamental wave F emitted by the laser medium 10 in the forward direction 14 such that the fundamental wave F polarized in this manner triggers a maximum frequency conversion upon passage through the nonlinear medium 18. An emission of frequency-converted light in the forward direction 14 is thus maximized by the polarization of the fundamental wave F by means of the second polarizer 22.

Due to the cooperation of the two polarizers 20 and 22, the harmonic wave H is emitted from the nonlinear medium 18 with maximum intensity exclusively in the forward direction 14.

Upon incidence on the decoupling mirror 6, the harmonic wave H is decoupled from the resonator 4, by which a laser beam L having the second frequency $f_2$ is generated.

The end mirror 8, the laser medium 10, the second polarizer 22, the nonlinear medium 18, the first polarizer 20, and the decoupling mirror 6 are arranged in succession along a linear optical axis 23 and thus along a linear beam path.

Figure 2:
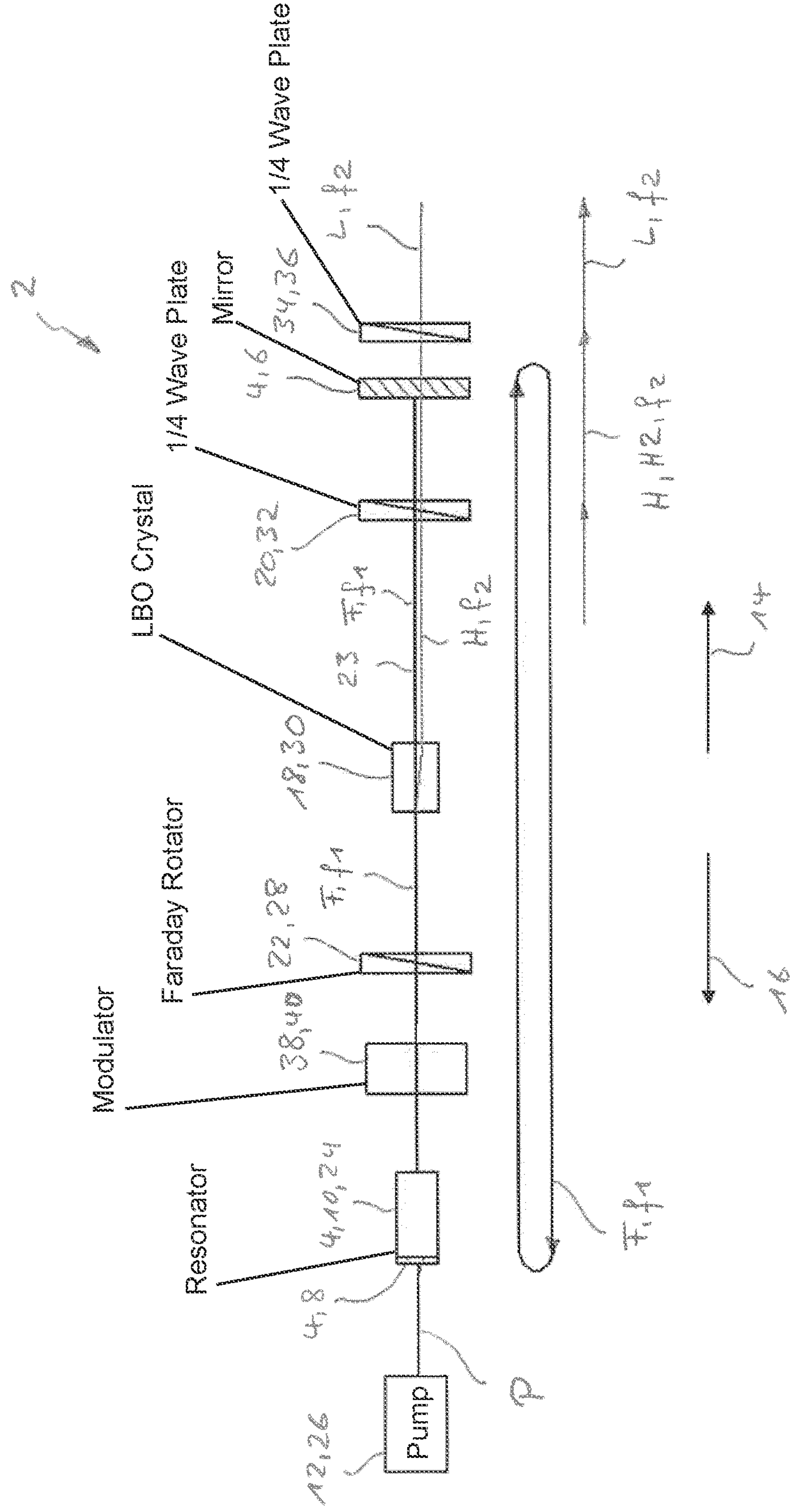
FIG. 2 is an illustration showing a first specific embodiment of the laser device in a representation according to FIG. 1.

A first specific embodiment of the laser device 2, which is only shown generally in FIG. 1, is shown in FIG. 2. The laser device 2 shown in FIG. 2 is a solid-state laser, which includes as the laser medium 10 a neodymium-doped yttrium-orthovanadate crystal ($Nd:YVO_4$ crystal 24). The $Nd:YVO_4$ crystal emits light in the infrared range having a light wavelength of $\lambda_1$ 1064 nm ($\lambda_1$=1064 nm) to form the fundamental wave F. Accordingly, the fundamental frequency $f_1$ is 282.0 THz here ($f_1$=282.0 THz). The fundamental wave F emitted by the laser medium 10 in the forward direction 14 is linearly polarized with a polarization direction which is assigned the angle 0° here and hereinafter.

The pump device 12 is formed in the example according to FIG. 2 by a diode laser 26, which optically excites the $Nd:YVO_4$ crystal 24 using a pump laser beam P.

The second polarizer 22 connected downstream of the $Nd:YVO_4$ crystal 24 in the forward direction 14 is designed as a Faraday rotator 28, which rotates the polarization direction of the fundamental wave F by an angle of 45°.

The optical nonlinear medium 18 is formed here by a crystal, namely a lithium triborate crystal (LBO crystal 30) in a type I phase match configuration, which induces a frequency doubling of the fundamental frequency $f_1$. The second frequency $f_2$ thus has the value of 564.0 THz ($f_2$=564.0 THz) here. Accordingly, the harmonic wave H generated by the LBO crystal 30 is the second harmonic H2 of the fundamental wave F, which has a wavelength $\lambda_2$ of 532 nm and is thus in the spectral range of green visible light. The LBO crystal 30 is moreover aligned in the beam path of the resonator 4*a* such that it converts the light of the fundamental frequency $f_1$ with maximum efficiency into the light of the second frequency $f_2$ when the light of the fundamental frequency $f_1$ is linearly polarized with a polarization direction of 45°. The Faraday rotator 28 and LBO crystal 30 are matched to one another such that the efficiency of the frequency doubling for the passage of the fundamental wave F is maximized by the LBO crystal 30 in the forward direction 14.

The second polarizer 22 connected downstream of the LBO crystal 30 in the forward direction 14 is formed in the example from FIG. 2 by a quarter-wave plate 32 matched to the fundamental wave F (and thus to light of the fundamental frequency $f_1$). The quarter-wave plate 32 is arranged in the beam path of the resonator 4 such that it (re)polarizes the fundamental wave F incident in the forward direction 14 as a linearly polarized wave having a polarization direction of 45° into a circularly polarized light wave.

The fundamental wave F is reflected at the downstream decoupling mirror 6 and is thus reflected back in the reverse direction 16 onto the quarter-wave plate 32. The fundamental wave F incident in the reverse direction 16 as the circularly polarized light wave is now (re-)polarized by the quarter-wave plate 32 into a linearly polarized light wave having a polarization direction of 135°.

The fundamental wave F polarized in this manner now passes in the reverse direction 16 through the LBO crystal 30. Due to the anisotropy of the LBO crystal 30 and the polarization of the fundamental wave F, the efficiency of the frequency doubling is minimized for the fundamental wave F propagating in the reverse direction 16.

Upon the passage of the fundamental wave F propagating in the reverse direction 16 through the Faraday rotator 28, the polarization direction of the fundamental wave F is again rotated by 45°. The fundamental wave F therefore leaves the Faraday rotator 28 in the reverse direction 16 as a linearly polarized wave having a polarization direction of 180°, which corresponds to the original polarization direction of 0°. After reflection at the end mirror 8, the fundamental wave F is reflected back on the laser medium 10 (thus the $Nd:YVO_4$ crystal 24) and the above-described circuit begins again.

Due to the suppression of the frequency doubling in the reverse direction 16, the second harmonic H2 is emitted from the LBO crystal 30 (at least approximately) exclusively in the forward direction 14. The second harmonic H2 is initially provided here as a linearly polarized light wave having a polarization direction of 135°. Since the quarter-wave plate 32 is matched to the fundamental wave F (and the associated wavelength $\lambda_1$), it has no defined polarization-influencing effect on the second harmonic H2. The second harmonic H2 is therefore provided with undefined polarization properties after the passage through the quarter-wave plate 32.

In this form, the second harmonic H2 is decoupled from the resonator 4 via the decoupling mirror 6 to form the laser beam L. To give the laser beam L a defined polarization property, a third polarizer 34 in the form of a further quarter-wave plate 36 is connected downstream from the decoupling mirror 6 outside the resonator 4. This further quarter-wave plate 36 is designed structurally identical to the quarter-wave plate 32 and is therefore also matched to the wavelength $\lambda_1$ of the fundamental wave F. However, it is rotated by 90° around the optical axis 23 in relation to the quarter-wave plate 32. The further quarter-wave plate 36 in this way compensates for the effect of the quarter-wave plate 32 on the second harmonic H2. After the passage of the laser beam L through the quarter-wave plate 36, the laser beam L is thus provided in linearly polarized form having a polarization angle of 135°.

In an optional refinement of the concept schematically shown in FIG. 1, the laser device 2 from FIG. 2 is configured as a quality-switched laser operated in a pulsed manner. The laser device 2 includes for this purpose as a further component a quality switch 38, which is interconnected in the illustration according to FIG. 2 between the laser medium 10 (thus the $Nd:YVO_4$ crystal 24 here) and the second polarizer 22 (thus the Faraday rotator 28 here). The quality switch 38 is embodied in the embodiment according to FIG. 2, for example, as an acousto-optical modulator 40 (Bragg cell).

In a manner known per se, the quality of the resonator 4 is reduced in intervals between each two laser pulses by the quality switch 38, so that the laser activity of the resonator 4 is prevented and therefore a particularly strong excitation of the laser medium 10 (thus of the Nd:$YVO_4$ crystal 24) is forced. To trigger a laser pulse, the quality of the resonator 4 is temporarily increased by the quality switch, so that the laser activity begins.

Alternatively thereto, the laser device 2 is operated as a mode-coupled laser. In this embodiment (essentially corresponding in hardware to the embodiment according to FIG. 2), a quality modulator, in particular again an acousto-optical modulator 40, is arranged for this purpose in the resonator 4. This quality modulator modulates the quality of the resonator 4 at a frequency which corresponds to the circulation time of a pulse in the resonator 4.

The profile of the fundamental wave F and the harmonic wave H (thus of the second harmonic H2 here) is schematically indicated below the resonator 4 in FIG. 2 for the purpose of illustration.

Figure 3:
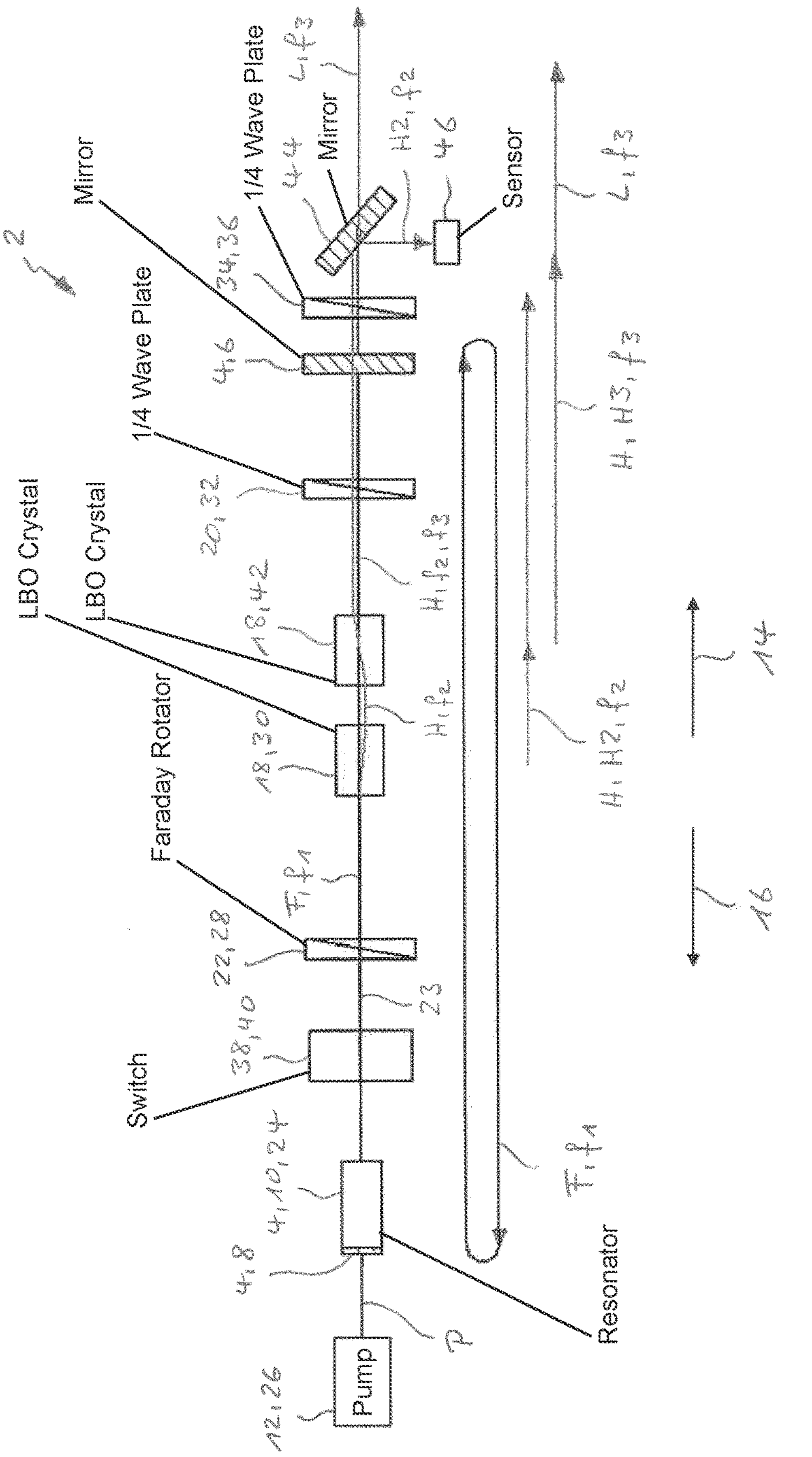
FIG. 3 is an illustration showing a second specific embodiment of the laser device in a representation according to FIG. 1.

The embodiment of the laser device 2 shown in FIG. 3 differs from the embodiments described on the basis of FIG. 2 in that the optical nonlinear medium 18 includes here, in addition to the frequency-doubling LBO crystal 30, a second crystal made of lithium triborate (LBO crystal 42), which is connected between the LBO crystal 30 and the first polarizer 20 (again in the form of the quarter-wave plate 32 here) in the beam path of the resonator 4. This second LBO crystal 42 generates, in operation of the laser device under the effect of the fundamental wave F and the second harmonic H2, light of a third frequency $f_3$, which corresponds to three times the fundamental frequency $f_1$ ($f_3$=845.9 THz). This frequency-tripled light is emitted by the LBO crystal 42 as the third harmonic H3. It has a wavelength $\lambda_3$ of 354 nm and is in the ultraviolet range of the electromagnetic spectrum. In the laser device 2 from FIG. 3, both the second harmonic H2 and the third harmonic H3 are decoupled from the resonator 4 via the decoupling mirror 6. The second LBO crystal 42 is preferably a crystal in type II phase match configuration.

The second LBO crystal 40 is also oriented in the beam path of the resonator 4 such that the frequency conversion (thus the frequency tripling here) is maximized for the fundamental wave F propagating in the forward direction 14. Frequency tripling is not triggered by the fundamental wave F propagating in the reverse direction 16 due to the lack of the second harmonic H2 in the LBO crystal 40. The third harmonic H3 is therefore also (at least approximately) emitted exclusively in the forward direction 14. A frequency doubling in the LBO crystal 30 due to the fundamental wave F propagating in the reverse direction 16 is again suppressed by the polarization of the fundamental wave F by means of the quarter-wave plate 32.

The original linear polarization destroyed by the quarter-wave plate is reestablished by the third polarizer 34 (also formed here by the quarter-wave plate 36) connected downstream from the decoupling mirror 6 for both the second harmonic H2 and the third harmonic H3.

In contrast to the embodiment according to FIG. 2, the laser device 2 according to FIG. 3 optionally has a frequency-selective mirror 44 connected downstream of the quarter-wave plate 36. The mirror 44 is transmissive for the light of the third frequency $f_3$, so that the third harmonic H3 decoupled from the resonator 4 to form the laser beam L passes through the mirror 42.

The second harmonic H2 decoupled from the resonator 4, in contrast, is deflected by the mirror 42. It is reflected in this case, for example, onto a light sensor 46 used for detecting the laser activity.

The profile of the fundamental wave F and the harmonic wave H (thus the second harmonic H2 and the third harmonic H3 here) is again schematically indicated in FIG. 2 for the purpose of illustration below the resonator 4.

The subject matter of the invention is particularly clear in the above-described exemplary embodiments, but is in no way restricted thereto. Rather, further embodiments of the invention can be derived from the claims and the above description. In particular, the third polarizer 34 described on the basis of FIGS. 2 and 3 and the quality switch 38 can also be used in other embodiments of the laser device 2 according to the invention. Furthermore, the first polarizer 20 and/or the second polarizer 22 can also be implemented in a way other than that shown in FIGS. 2 and 3. For example, a Faraday rotator, which rotates the polarization direction of the fundamental wave by 45°, can be used for the first polarizer 20 instead of the quarter-wave plate 32. Furthermore, other suitable materials than those described by way of example can be used for the laser medium 10 and for the optical nonlinear medium 18.

The following is a summary list of reference numerals and the corresponding structure used in the above description of the invention.

LIST OF REFERENCE SIGNS

2 laser device
4 resonator
6 decoupling mirror
8 end mirror
10 (laser) medium
12 pump device
14 forward direction
16 reverse direction
18 (optical nonlinear) medium
20 (first) polarizer
22 (second) polarizer
23 optical axis
24 Nd:$YVO_4$ crystal
26 diode laser
28 Faraday rotator
30 LBO crystal
32 quarter-wave plate
34 (third) polarizer
36 quarter-wave plate
38 quality switch
40 acousto-optical modulator
42 LBO crystal
44 (frequency-selective) mirror
46 light sensor
$f_1$ fundamental frequency
$f_2$ (second) frequency
F fundamental wave
H harmonic wave
H2 (second) harmonic
H3 (third) harmonic
L laser beam
P pump laser beam

The invention claimed is:

1. A laser device, comprising:

an optical resonator having two resonator mirrors including a decoupling mirror and an end mirror;

an optical active medium for generating light of a first frequency;

an optical nonlinear medium for converting light of the first frequency into light of another frequency, wherein said optical active medium and said optical nonlinear medium are disposed in a beam path between said two resonator mirrors; and a first polarization-influencing laser optical unit, for polarizing the light of the first frequency reflected by said decoupling mirror in a direction toward said end mirror such that a frequency conversion of the light of the first frequency thus polarized is suppressed during a passage through said optical nonlinear medium.

2. The laser device according to claim 1, further comprising a second polarization-influencing laser optical unit, which polarizes the light of the first frequency propagating in a direction toward said decoupling mirror such that a frequency conversion of the light of the first frequency thus polarized is promoted during the passage through the optical nonlinear medium.

3. The laser device according to claim 2, wherein said first and second polarization-influencing laser optical units are selected from the group consisting of a wave plate, a quarter-wave plate, a polarization rotator, a Faraday rotator, a quartz crystal rotator, and a liquid crystal rotator.

4. The laser device according to claim 2, wherein:

said first polarization-influencing laser optical unit is a quarter-wave plate; and said second polarization-influencing laser optical unit is selected from the group consisting of a polarization rotator, a Faraday rotator, a quartz crystal rotator, and a liquid crystal rotator.

5. The laser device according to claim 2, wherein said first and second polarization-influencing laser optical units are selected from the group consisting of a polarization rotator, a Faraday rotator, a quartz crystal rotator, and a liquid crystal rotator.

6. The laser device according to claim 1, wherein said optical resonator has a linear beam path.

7. The laser device according to claim 2, further comprising a third polarization-influencing laser optical unit, connected downstream of said decoupling mirror and is configured to compensate for an influence of said first polarization-influencing laser optical unit on a frequency-converted light.

8. The laser device according to claim 7, wherein said first polarization- influencing laser optical unit and said third polarization-influencing laser optical unit are formed by quarter-wave plates which are structurally identical but are rotated relative to one another by 90°.

9. The laser device according to claim 1, further comprising a quality switch.

10. The laser device according to claim 1, wherein said active optical medium is a solid crystal.

11. The laser device according to claim 1, wherein said optical nonlinear medium has an optical nonlinear crystal in a type I phase match configuration.

12. The laser device according to claim 1, wherein said optical nonlinear medium contains at least two optical nonlinear crystals connected in succession to one another.

13. The laser device according to claim 12, wherein said at least two optical nonlinear crystals connected in succession to one another comprise a first crystal in a type I phase match configuration and a second crystal in a type II phase match configuration.

14. The laser device according to claim 1, further comprising a second polarization-influencing laser optical unit, which polarizes the light of the first frequency propagating in a direction toward said decoupling mirror such that a frequency conversion of the light of the first frequency thus polarized is maximized during the passage through the optical nonlinear medium.

15. The laser device according to claim 9, wherein said quality switch is an electro-optical quality switch, an acousto-optical quality switch or a passive quality switch.

16. The laser device according to claim 10, wherein said solid crystal is a neodymium-doped yttrium-orthovanadate crystal.

17. The laser device according to claim 11, wherein said optical nonlinear crystal is a lithium triborate crystal.

18. The laser device according to claim 13, wherein said at least two optical nonlinear crystals connected in succession to one another are lithium triborate crystals.

19. The laser device according to claim 1, wherein the frequency conversion of the light of the first frequency thus polarized is minimized during the passage through said optical nonlinear medium.

* * * * *